United States Patent
Ono et al.

(10) Patent No.: US 9,732,195 B2
(45) Date of Patent: Aug. 15, 2017

(54) REINFORCING CARBON FIBER BUNDLE, METHOD FOR MANUFACTURING THE SAME AND METHOD FOR MANUFACTURING COMPOSITE USING THE SAME

(71) Applicant: Teijin Limited, Osaka-shi, Osaka (JP)

(72) Inventors: Tubasa Ono, Matsuyama (JP); Hiroshi Sakurai, Matsuyama (JP); Takeshi Naito, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 175 days.

(21) Appl. No.: 14/401,377

(22) PCT Filed: May 14, 2013

(86) PCT No.: PCT/JP2013/063348
§ 371 (c)(1),
(2) Date: Nov. 14, 2014

(87) PCT Pub. No.: WO2013/172318
PCT Pub. Date: Nov. 21, 2013

(65) Prior Publication Data
US 2015/0133598 A1 May 14, 2015

(30) Foreign Application Priority Data

May 15, 2012 (JP) .................. 2012-111443

(51) Int. Cl.
| | | |
|---|---|---|
| *D06M 15/59* | (2006.01) | |
| *C08J 5/06* | (2006.01) | |
| *D06M 23/08* | (2006.01) | |
| *B29C 43/00* | (2006.01) | |
| *B29C 70/10* | (2006.01) | |
| *C08J 5/04* | (2006.01) | |
| *C08J 5/24* | (2006.01) | |
| *B29K 77/00* | (2006.01) | |
| *B29K 105/00* | (2006.01) | |
| *B29K 307/04* | (2006.01) | |
| *B29L 9/00* | (2006.01) | |

(52) U.S. Cl.
CPC ............... *C08J 5/06* (2013.01); *B29C 43/003* (2013.01); *B29C 70/10* (2013.01); *C08J 5/042* (2013.01); *C08J 5/24* (2013.01); *D06M 15/59* (2013.01); *D06M 23/08* (2013.01); *B29K 2077/00* (2013.01); *B29K 2105/0085* (2013.01); *B29K 2307/04* (2013.01); *B29L 2009/00* (2013.01); *C08J 2375/04* (2013.01); *C08J 2377/02* (2013.01); *Y10T 428/2918* (2015.01)

(58) Field of Classification Search
None
See application file for complete search history.

(56) References Cited

U.S. PATENT DOCUMENTS

2009/0062426 A1    3/2009  Shiraki et al.

FOREIGN PATENT DOCUMENTS

| EP | 1862281 A1 | 12/2007 |
|---|---|---|
| JP | H07-197381 A | 8/1995 |
| JP | 09228248 A * | 9/1997 |
| JP | H09-228248 A | 9/1997 |
| JP | 2003-166174 A | 6/2003 |
| JP | 2006-124847 A | 5/2006 |
| JP | 2007-131959 A | 5/2007 |
| JP | 2012-041658 A | 3/2012 |
| JP | 2013-087396 A | 5/2013 |
| JP | 2013-104156 A | 5/2013 |
| WO | 2012/058351 A1 | 5/2012 |

OTHER PUBLICATIONS

Jul. 30, 2013—International Search Report—Int'l App PCT/JP2013/063348.

* cited by examiner

*Primary Examiner* — Richard A Huhn
(74) *Attorney, Agent, or Firm* — Banner & Witcoff, Ltd.

(57) ABSTRACT

There is provided a reinforcing carbon fiber bundle of the present invention is a reinforcing carbon fiber bundle with a sizing agent adhered to surfaces of carbon fibers, and characterized in that the sizing agent is constituted by at least two components, a first component does not melt at 150° C., and a second component in flowable at 150° C., and the reinforcing carbon fiber bundle is improved in impregnation property and openability and is excellent in workability and optimum for a composite.

18 Claims, No Drawings

REINFORCING CARBON FIBER BUNDLE, METHOD FOR MANUFACTURING THE SAME AND METHOD FOR MANUFACTURING COMPOSITE USING THE SAME

CROSS REFERENCE TO RELATED APPLICATIONS:

This is a U.S. National Phase Application under 35 U.S.C. §371 of International Application No. PCT/JP2013/063348, filed May 14, 2013 and published Under PCT Article 21 (2), which claims priority to Japanese Application No. 2012-111443, filed May 15, 2012, the entire contents of each of which are incorporated herein by reference.

TECHNICAL FIELD

The present invention relates to a carbon fiber bundle, and more particularly to a reinforcing carbon fiber bundle excellent in impregnation property and openability, a method for manufacturing the same and a method for manufacturing a composite, using the same.

BACKGROUND ART

A carbon fiber is a material to which many applications have been made as a composite material with a resin, in order to increase strength of the resin and to buffer brittle fracture of the carbon fiber with the resin. However, the carbon fiber is commonly used as a fiber bundle constituted by many filaments and has low elongation, so that there have been problems that fluffs due to mechanical friction or the like are occurred and the filament fibers are prone to be breaked. Accordingly, when the carbon fiber is used, it is general to impart a sizing agent to a surface of the carbon fiber, in order to improve bundling properties and handleability and to improve adhesiveness between the fiber and the resin. This is because the use of such a sizing agent decreases the fluffs and the breakage of the fiber, which makes it possible to optimize a reinforcing effect of the carbon fiber.

For example, Patent Document 1 discloses a technique of improving interfacial adhesive strength using an epoxy resin-based sizing agent. As long as a matrix resin to be reinforced with the carbon fiber bundle is a thermosetting resin, it is not so bad. However, in the case of using a thermoplastic resin, there has been a problem of failing to obtain high adhesive strength generally because of poor compatibility between the resin and the sizing agent.

Accordingly, in order to enhance the compatibility, there is also considered a method of performing sizing using a thermoplastic resin-based sizing agent. However, the thermoplastic resin-based sizing agent is generally liable to harden a texture, although it improves interfacial adhesive strength, and significantly deteriorates handleability and processability. Physical properties of a composite finally obtained have been insufficient. For example, Patent Document 2 discloses a method of imparting an acid-modified polyolefin-based sizing agent in the case of using polypropylene that is a thermoplastic resin as the matrix resin. However, although an improvement in interfacial adhesive strength has been observed, processability in cutting or opening has been insufficient.

Further, in the case of using an engineering plastic resin (for example, a polyamide, a polyester, a polycarbonate or the like) having excellent physical properties as the thermoplastic resin, molding is generally performed between the melting point of the thermoplastic resin and the decomposition temperature thereof. However, there has been a problem that impregnation of the matrix resin into the fiber bundle is difficult because of high viscosity of the matrix resin within such a temperature range. Low viscosity as in the case of the conventional thermosetting resin is not obtained, so that fluidity of the thermoplastic resin becomes insufficient. As a result, it has had a problem that short-time molding of the composite becomes difficult.

In order to solve these problems, there is also considered a method of imparting a plasticizer and a sizing agent to the fiber at the same time. However, there has been a problem that such a plasticizer generally has an adverse effect on the matrix resin or adhesion thereof with the fiber, resulting in decreases in composite physical properties.

[Patent Document 1] JP-A-7-197381
[Patent Document 2] JP-A-2006-124847

SUMMARY OF INVENTION

Problems that the Invention is to Solve

The invention provides a reinforcing carbon fiber bundle that is improved in impregnation property and openability, excellent in workability and optimum for a composite.

Means for Solving the Problems

A reinforcing carbon fiber bundle of the invention is a reinforcing carbon fiber bundle with a sizing agent adhered to surfaces of carbon fibers therein, and is characterized in that the sizing agent includes at least two components, wherein a first component does not melt at 150° C. and a second component is flowable at 150° C.

Further, the second component is preferably a copolymer resin or a polyamide ternary copolymer resin. Furthermore, it is preferred that the first component is granular, that the amount of the sizing agent adhered to the carbon fibers is within the range of 0.1 to 20% by weight, that the content (weight ratio) of the first component is twice or more that of the second component and that the first component is adhered to the fiber surfaces through the second component. In particular, it is preferred that the melting point of the first component is 150° C. or more, and the melting point of the second component is less than 150° C.

Further, a method for manufacturing a reinforcing carbon fiber bundle of the invention is a method for manufacturing a reinforcing carbon fiber bundle including drying a carbon fiber bundle to which a sizing liquid has been imparted, and is characterized in that the sizing liquid includes at least two components, wherein, at a drying temperature, a first component does not melt whereas a second component has fluidity. It is preferred that the first component is granular and that the second component is granular in the sizing liquid. Furthermore, it is preferred that the particle size of the first component or the second component is 5 μm or less, that the content (weight ratio) of the first component is twice or more that of the second component and that the melting point of the first component is equivalent to or more than the drying temperature, and the melting point of the second component is less than the drying temperature.

Further, a method for manufacturing a composite of the invention is a method of press molding a mixture constituted by the above-mentioned reinforcing carbon fiber bundle of the invention and a resin. Further, it is preferred that the reinforcing carbon fiber bundle in the mixture is arranged randomly in plane and that the resin is a thermoplastic resin. Furthermore, the reinforcing carbon fiber bundle may be composed of short fibers, or the reinforcing carbon fiber bundle may be composed of long fibers.

Advantageous Effects of Invention

According to the invention, there is provided a reinforcing carbon fiber bundle that is improved in impregnation property and openability, excellent in workability and optimum for a composite.

DESCRIPTION OF EMBODIMENTS

The reinforcing carbon fiber bundle of the invention is a reinforcing carbon fiber bundle with a sizing agent adhered to surfaces of carbon fibers therein. Then, the sizing agent includes at least two components, wherein a first component does not melt at 150° C. and a second component is a component having fluidity at 150° C. As used herein, "does not melt" in the invention includes the case where for a resin having no melting point, it is not in a molten state because of its sufficiently high glass transition point temperature, as well as the case where it is clearly a solid at a temperature equivalent to or less than the melting point. Further, "having fluidity" means the case where the resin has fluidity because of its low viscosity, as well as the case where it completely melts.

The carbon fiber bundle of the invention meeting such requirements becomes a reinforcing carbon fiber bundle that is improved in impregnation property and openability, excellent in workability and particularly optimum for a composite.

As the carbon fiber bundle of the invention, there can be used a polyacrylonitrile (PAN)-based carbon fiber, a petroleum-coal pitch-based carbon fiber, a rayon-based carbon fiber, a lignin-based carbon fiber, or the like. Then, from the viewpoints of productivity in an industrial scale and mechanical characteristics, PAN-based carbon fiber produced using PAN as a raw material is particularly preferred. An average diameter of a single carbon fiber constituting the carbon fiber bundle is preferably from 5 to 10 µm. Further, not only carbon fiber bundle constituted by long fibers, but also one constituted by short fibers is preferred. In the case of the short fibers, the length thereof is preferably 100 mm or less, and particularly preferably within a range of 5 to 80 mm.

Further, the number of monofilaments constituting the carbon fiber bundle is usually 500 or more, and preferably 1000 or more. When the number of monofilaments constituting the carbon fiber bundle is small, productivity of the carbon fiber is significantly deteriorated although handling properties are improved by an increase in flexibility of the carbon fiber bundle. On the other hand, when it is too many, flameproofing or infusibilizing treatment of precursor fiber of the carbon fiber is less likely to be sufficiently completed, and mechanical properties of the carbon fiber finally obtained are prone to be decreased. For this reason, generally, the number of monofilaments is preferably 60000 or less. Further, the number of monofilaments constituting the carbon fiber bundle is more preferably within a range of 3000 to 40000, and still more preferably within a range of 5000 to 30000.

Furthermore, for the purpose of enhancing affinity of the carbon fiber bundle with the sizing agent, the carbon fibers are also preferred in which an oxygen-containing functional group is introduced to the surfaces of the carbon fibers in the carbon fiber bundle before sizing treatment.

The carbon fiber bundle of the invention has the sizing agent adhered to a surface thereof, and this sizing agent is required to be constituted by at least two components. Then, the amount of this sizing agent adhered to the carbon fibers is preferably within a range of 0.1 to 20% by weight. Further, the amount adhered to the carbon fiber is preferably within a range of 0.3 to 15% by weight.

Specific examples of the first components of the sizing agents used in the invention include epoxy resins, urethane resins, vinyl chloride resins, vinylidene chloride resins, vinyl acetate resins, polyvinyl alcohol resins, polystyrene resins, acrylonitrile-styrene resins (AS resins), acrylonitrile-butadiene-styrene resins (ABS resins), acrylic resins, methacrylic resins, polyolefin resins, polyamide resins, polyacetal resins, polycarbonate resins, polyethylene terephthalate resins, polybutylene terephthalate resin, polyarylate resins, polyphenylene ether resins, polyphenylene sulfide resins, polysulfone resins, polyethersulfone resins, polyether ether ketone resins, polylactic acid resins, polyimide resins, polyvinylpyrrolidone and the like. Copolymers or modified resins of the ones shown above or mixtures of two or more containing them may be used. In particular, when the ones shown herein can be obtained as general dispersions in water, the invention can be suitably applied. More suitably, main components include polyolefin resins and polyamide resins. In the case of using the polyolefin resin or the polyamide resin, for example, in the case of the polyolefin resin, high affinity is obtained to a polyolefinic resin such as polypropylene, and in the case of the polyamide resin, high adhesiveness is obtained to a resin with high polarity, particularly to a polyamide resin.

Further, specific examples of the second components of the sizing agents used in the invention include epoxy resins, urethane resins, vinyl chloride resins, vinylidene chloride resins, vinyl acetate resins, polystyrene resins, acrylonitrile-styrene resins (AS resins), acrylonitrile-butadiene-styrene resins (ABS resins), acrylic resins, methacrylic resins, polyolefin resins, polyamide resins, polyacetal resins, polycarbonate resins, polyethylene terephthalate resins, polyethylene naphthalate resins, polybutylene terephthalate resin, polyarylate resins, polyphenylene ether resins, polyphenylene sulfide resins, polysulfone resins, polyethersulfone resins, polyether ether ketone resins, polylactic acid resins, polyimide resins and the like.

More preferably, it is preferred to select, as the second component, a resin that forms an alloy to the matrix resin. For example, when a polyamide resin is used as the matrix resin, it is preferred to use a polyamide resin, a polyphenylene ether resin, a polyester-based resin (a polyethylene terephthalate resin or a polybutylene terephthalate resin), a polyolefin resin, an acrylonitrile-styrene resin (AS resin) or an acrylonitrile-butadiene-styrene resin (ABS resin). Similarly, to a polycarbonate resin, it is preferred to use a polycarbonate resin, a polyolefin resin, a polyester-based resin (a polyethylene terephthalate resin or a polybutylene terephthalate resin), an acrylonitrile-styrene resin (AS resin) or an acrylonitrile-butadiene-styrene resin (ABS resin).

Further, the second component used in the sizing agent is preferably a thermoplastic resin. In the case of the thermoplastic resin, moldability of a composite is less likely to be deteriorated by reheating even after forming the composite, and thereby providing an advantage in recyclability.

Furthermore, the same material as the matrix resin used in the composite later is particularly preferably used as the second component. Impregnation property is improved because of its high compatibility, and it becomes possible to form the composite having high physical properties. From such a viewpoint as well, the polyamide resin is particularly preferred as the second component.

In addition, the copolymer resin is preferred as the second component of the sizing agent. This is because there are advantages that control of the fluidity and melting point that are important elements in the invention is easily performed and that the physical properties required are also easily secured, by selecting a copolymerization component. Particularly preferred examples of the second components of the sizing agents include polyamide ternary copolymer resins. In particular, the polyamide ternary copolymer resin constituted by nylon 6, nylon 66 or nylon 12 is preferred.

By employing such a second component, it has become possible to control bundling properties of fiber bundle and produce an effect of increasing adhesiveness between the fiber and the resin.

Further, as the first component and the second component constituting the sizing agent, there may be used copolymers or modified resins of the ones shown above or mixtures of two or more containing them may be used. In particular, when the ones shown herein can be obtained as general dispersions in water, they can be suitably applied to the invention. Here, the first component and the second component usually each constitute different molecules. However, both of the first component and the second component may be present in one molecule as a blended state.

The reinforcing carbon fiber bundle of the invention is one in which the sizing agent having the components as described above is adhered to the surfaces of the carbon fibers, and the sizing agent is constituted by at least two components. Then, it is required that the first component does not melt at 150° C. and that the second component is a component having fluidity at 150° C.

As used herein, "does not melt" regarding the first component in the invention also includes the case where for a resin having no melting point, it is not in a molten state because of its sufficiently high glass transition point temperature, as well as the case where it is clearly a solid at a temperature equivalent to or less than the melting point. The glass transition temperature of the first component is preferably within a range of 30 to 200° C. More preferably, it is from 40 to 180° C.

Further, when it is not in a molten state, for example, the viscosity at a shear rate of $10 \text{ s}^{-1}$ at that temperature is preferably 500 Pa·s or more, and particularly preferably within a range of 1000 to 10000 Pa·s. Furthermore, the viscosity at a shear rate of $1000 \text{ s}^{-1}$ is preferably 50 Pa·s or more, and particularly preferably within a range of 800 to 8000 Pa·s. The viscosity of the first component is preferably within such a range, and it is required in the invention that the first component does not melt.

In addition, "having fluidity" of the second component of the invention means the case where the resin has fluidity because of its low viscosity, as well as the case where it completely melts. When it has fluidity, for example, the viscosity at a shear rate of $10 \text{ s}^{-1}$ at that temperature is preferably less than 500 Pa·s, and particularly preferably within a range of 100 to 450 Pa·s. Further, the viscosity at a shear rate of $1000 \text{ s}^{-1}$ is preferably less than 50 Pa·s, and particularly preferably within a range of 1 to 45 Pa·s.

The viscosity at a shear rate of $10 \text{ s}^{-1}$ described above corresponds to the viscosity at the time when the fiber bundle is treated with the sizing agent thereon. Further, the viscosity of a shear rate of $1000 \text{ s}^{-1}$ corresponds to the viscosity at the time when the composite is molded with the fiber bundle and the matrix resin. In the invention, the viscosities of the first component and the second component are preferably within such ranges, and it is required in the invention that the first component does not melt, whereas the second component has fluidity.

Then, particularly preferably, in the reinforcing carbon fiber bundle of the invention, the viscosity at a shear rate of $1000 \text{ s}^{-1}$ at 150° C. is preferably 50 Pa·s or more for the first component, and less than 50 Pa·s for the second component. By using the two kinds of components having a difference in viscosity under such high-temperature high-shear force conditions, it becomes possible to more suitably control the degree of impregnation of the matrix resin when the fiber resin composite is finally molded in a later step.

Further, in order to be such first component and second component, it is preferred that the melting point of the first component is 150° C. or more, and the melting point of the second component is less than 150° C., as the sizing agent used for the reinforcing carbon fiber bundle of the invention.

When the first component used in the invention melts because of its excessively low melting point or the like, this first component melts during heat treatment such as drying, and the sufficient physical properties of the composite as a final product cannot be secured. In order to prevent melting, the resin used as the first component can be optimized. In particular, when the first component is the copolymer resin, it is possible to control the melting point and the like by changing the copolymerization ratio.

Such a first component of the sizing agent in the invention is further preferably a component easily compatible with the resin to be composited. As used herein, examples of relationship of "easily compatible" are resins close to each other in solubility parameter or resins that can be bound to each other as copolymerization components. In that sense, the melting point of the first component is preferably lower than the melting point of the matrix resin formed into the composite. The melting point of the first component used in the sizing agent of the invention is preferably within a range of 150° C. to 230° C., and particularly preferably within a range of 180° C. to 210° C.

The second component, the other component constituting the sizing agent, is required to have fluidity, and the melting point thereof is preferably less than 150° C.

As the sizing agent, when the second component does not have fluidity unlike the invention, for example, when the melting point thereof is 150° C. or more, the effect of the invention cannot be obtained. This is because the first component does not melt and is in a solid state at 150° C., so that it becomes impossible that film formation of the sizing agent on the surfaces of the carbon fibers is performed at 150° C., which is the drying temperature of a general sizing agent, when the second component as well does not have fluidity at 150° C. When it is impossible that film formation of the sizing agent on the surface of the fiber bundle is performed, not only the first component that does not melt and is preferably in a granular state cannot be fixed to the fiber bundle, but also bundling properties of the fiber bundle becomes insufficient, causing a problem such as deterioration in processability.

Such fluidity of the second component in the sizing agent of the invention can be obtained by decreasing the melting point or optimizing the resin used as the second component, for example, by decreasing the molecular weight. In particular, when the second component is the copolymer resin, such fluidity can be easily obtained by changing the copolymerization ratio. Further, fluidity generally correlates with the melting point, and the melting point of the second component is preferably from 60° C. to 140° C., more preferably from 80° C. to 140° C., and still more preferably within a range of 95° C. to 140° C. When the melting point is too low, film formation is performed at a stage where water is evaporated, thereby involving water to cause a tendency to decrease the physical properties.

In such a sizing agent used in the invention, the melting point of the second component is generally lower than the melting point of the first component. Then, the second component acts as a component for film formation by having such a difference in melting point, carries particles of the first component on the surfaces of the carbon fibers, and effectively acts at the time of molding the composite. In particular, in the carbon fiber bundle of the invention, a state is preferred in which the respective filaments constituting the carbon fiber bundle are covered with the second component, and the first component as high-melting particles are present between the filaments and on the surface of the filament bundle. When the particle size of the first component having a high melting point is sufficiently small, a state is obtained in which the particles enter among the filaments, which makes it possible to perform uniform treatment. On the other hand, when the particle size of the first component having a high melting point is large, the particles are adhered to the surface of the filament bundle. The adhered amount of the sizing agent is easily improved, and it becomes easy to perform resin impregnation in a step of forming the composite later.

Further, the second component of the sizing agent used in the reinforcing carbon fiber bundle of the invention is preferably one that is easily compatible with the resin to be composited and melts as the whole resin particles at the heat treatment temperature. Adhesiveness between the fiber and the resin and impregnation property are further improved by being compatibilized with the resin like this.

Furthermore, as the sizing agent used in the reinforcing carbon fiber bundle of the invention, it is also preferred that the first component contains large particles having a particle size of 1 μm or more. In the invention, it becomes easy to increase the amount of the sizing agent adhered to the fibers by making the particles having such a large particle size being contained, and impregnation of the resin at the time of finally forming a composite material is performed more easily. However, when the particle size is excessively large, the particle size becomes too large to the fibers used, and it becomes difficult to keep the particles as a particle on the fibers in the subsequent steps. In that case, conversely, the sufficient adhered amount is less likely to be secured, so that the size is preferably 20 μm or less. In addition, when the size is too large, uniform adhesion to the fiber surfaces tends to become difficult.

On the other hand, in the first component used in the sizing agent of the invention, it is preferred that particles of 5 μm or less are present, in addition to the large particles as described above or separately therefrom. Further, as the particles constituting the first component of the invention, it is preferred to use particles having a particle size of 2 μm or less, and particularly, it is optimum to be within a range of 0.01 μm to 1.5 μm. When such a component having a small particle size is contained, there is an advantage of being easily uniformly adhered to the fibers, and particularly being adhered not only to the surface of the carbon fiber bundle, but also between the fibers inside the fiber bundle.

Further, as the sizing agent used in the carbon fiber bundle of the invention, the content (weight ratio) of the above-mentioned first component that is less likely to melt is preferably twice or more that of the second component having high fluidity. When the content of the easily flowable second component is increased, the second component that flows into a film form by heat treatment is cooled to fix the fiber bundle, so that the fiber bundle is hardened to deteriorate handling properties. The ratio of the first component/the second component is further preferably within a range of 5/1 to 20/1. As used herein, the ratio is measured by weight. When the ratio of the second component is too low, poor impregnation tends to easily occur.

Further, the sizing agent used in the invention preferably contains a surfactant. The resin in the sizing agent is more sufficiently dispersed by addition of the surfactant, and more uniformly adhered to the fiber surfaces. There is no particular limitation on the surfactant to be used, and it may be any as long as a dispersion constituted by the sizing agent and water can be prepared. Specific examples thereof include nonionic surfactants, anionic surfactants, cationic surfactants and amphoteric surfactants. Of these, from the viewpoint of the particle size of dispersed particles, the nonionic surfactants or the anionic surfactants are preferably used, and the nonionic surfactants are more preferred. Preferred specific examples the nonionic surfactants include polyoxyalkylene alkyl ethers represented by the following formula (1):

$$H_{2m+1}C_m\text{—O—}(X\text{—O})_n\text{—H} \tag{1}$$

(m: an integer of 8 to 22, n: an integer of 2 to 20, X: an alkylene group having 1 to 5 carbon atoms)

The carbon number of the alkylene group represented by X is preferably from 2 to 5, and the polyoxyalkylene alkyl ethers include, for example, polyoxyethylene lauryl ether, polyoxyethylene cetyl ether, polyoxyethylene oleyl ether and the like. These compounds may be used either alone or as a mixture of two or more thereof. In the invention, the surfactant is only required to be able to obtain an aqueous dispersion of the resin constituting the sizing agent, and it is preferred that the amount of the surfactant to be used is suppressed as low as possible. The amount of the surfactant contained in the opened carbon fiber bundle of the invention is preferably from 0.01 to 8 parts by weight, based on 100 parts by weight of the resin solid content in the sizing agent.

In such a reinforcing carbon fiber bundle of the invention, the first component that does not melt is firmly fixed to the surface of the carbon fiber bundle by the high fluidity second component adhered to the surface of the carbon fiber bundle. Then, the carbon fiber bundle of the intention is less likely to produce fluffs and the like and excellent in handling properties, and becomes a fiber bundle extremely excellent in impregnation property of the matrix resin at the time when the composite is formed. Further, when a state is obtained in which the first component as the high-melting particles that do not melt enters among filaments of the carbon fiber bundle of the invention, it has an effect that the matrix resin becomes more easily impregnable at the time when the composite is molded. This is partly due to an effect that spaces are formed among the filaments by the presence of the particles of the first component so that the matrix resin is impregnated in the spaces, and further due to an effect that the particles themselves of the first component are melted by heat at the time of final molding to act similarly to the matrix resin.

Not only the reinforcing carbon fiber bundle of the invention is excellent in handling properties, but also it becomes possible to perform impregnation of the matrix resin for a shorter period of time, thus greatly contributing to an improvement in productivity of the composite. Further, the composite obtained is sufficiently impregnated with the matrix resin, and the composite is obtained which is decreased in strength unevenness and has high quality.

Such a reinforcing carbon fiber bundle of the invention can be obtained, for example, by the method for manufacturing a reinforcing carbon fiber bundle, which is another one of the invention.

That is to say, this method is a method for manufacturing a reinforcing carbon fiber bundle including drying a carbon fiber bundle to which a sizing liquid has been imparted, wherein the sizing liquid is constituted by at least two components, wherein, at a drying temperature, a first component does not melt whereas a second component has fluidity,. As the carbon fiber bundle and a sizing agent contained in the sizing liquid, which are used at this time, there can be used the same ones as used in the case of the reinforcing carbon fiber bundle of the invention described above.

In the method for manufacturing a reinforcing carbon fiber bundle of the invention, as the sizing liquid, there is used one in which the first component does not melt at the drying temperature and the second component has fluidity at the drying temperature. In the invention, the fiber bundle can be bundled with the sizing agent contained in the sizing liquid by drying the carbon fiber bundle to which such a sizing liquid has been adhered, thereby being able to obtain the carbon fiber bundle controllable in hardness and excellent in impregnation property.

As used herein, "does not melt" of the first component in the invention also includes the case where for a resin having no melting point, it is not in a molten state because of its sufficiently high glass transition point temperature, as well as the case where it is clearly a solid at a temperature equivalent to or less than the melting point. The glass transition temperature of the first component is preferably within a range of 30 to 200° C.

Further, when it is not in a molten state, more specifically, the viscosity at a shear rate of $10 \ s^{-1}$ at that temperature is preferably 500 Pa·s or more, and particularly preferably within a range of 1000 to 10000 Pa·s. The viscosity at a shear rate of $10 \ s^{-1}$ corresponds to the viscosity at the time when the fiber bundle is treated with the sizing agent. It is preferred that the viscosity of the first component is within such a range, and that the first component does not melt at the time of drying treatment.

Furthermore, "having fluidity" of the second component of the invention means the case where the resin has fluidity because of its low viscosity, as well as the case where it completely melts. When it has fluidity, more specifically, the viscosity at a shear rate of $10 \ s^{-1}$ at that temperature is preferably less than 500 Pa·s, and particularly preferably within a range of 100 to 450 Pa·s. The viscosity at a shear rate of $10 \ s^{-1}$ corresponds to the viscosity at the time when the fiber bundle is treated with the sizing agent. It is preferred that the viscosity of the second component is within such a range, and that the second component has fluidity at the time of drying treatment.

In addition, in order to obtain such first component and second component, it is preferred that the first component has a melting point equivalent to or more than the drying temperature, as the sizing agent used for the reinforcing carbon fiber bundle of the invention. Further, it has preferably a melting point of 5° C. or more higher than the drying temperature, and particularly preferably a melting point of 10° C. or more higher than the drying temperature. Such a high melting point can be obtained by optimizing the resin used as the first component, and particularly, when the first component is the copolymer resin, the melting point can be controlled by changing the copolymerization ratio.

The second component, the other component in the sizing liquid, has fluidity at the drying temperature as a large difference from the first component, and further, the melting point thereof is preferably less than the drying temperature. When the second component of the sizing liquid used in the invention does not have fluidity because of its excessively high melting point, the effect of the invention is not obtained. This is because when the second component does not have fluidity at the treating temperature thereof, it becomes impossible that film formation of the sizing agent on the surfaces of the carbon fibers is not performed in a drying step. Problems of deterioration in processability and the like due to insufficient bundling properties occur by the failure of the constituents of the sizing liquid to perform film formation. Further, the first component in the granular state, which is a preferred form, cannot be kept in the fiber bundle, and the effect of the invention is decreased.

Such fluidity of the second component can be obtained by optimizing the resin used as the second component. For example, the melting point can be decreased by decreasing the molecular weight. In particular, when the second component is the copolymer resin, it is possible to easily obtain the suitable melting point by changing the copolymerization ratio. Further, the melting point of the second component is preferably within a temperature range of 5° C. or more lower than the drying temperature. When the melting point is too low, film formation is performed at a stage where water is evaporated, thereby involving water to cause a tendency to decrease the physical properties.

Further, in the sizing liquid used in the reinforcing carbon fiber bundle of the invention, either or both of the first component and the second component are preferably particles having a particle size of 5 μm or less. Meanwhile, as the particle size as used herein, the value of the particle size $D_{50}$ of 50% in volume fraction is employed, unless otherwise indicated. More specifically, this particle size is measured by a $D_{50}$ process using a laser diffraction particle size analyzer, and means a particle size corresponding to 50% by volume of the particles.

Although the particle size of the particles each component of the invention is preferably 5 μm or less, as described above, it is more preferably 2 μm or less, and particularly optimally within a range of 0.01 μm to 1.5 μm. When such a component having a small particle size is contained, it is easily uniformly adhered to the fibers. Further, the particles are adhered not only to the surface of the carbon fiber bundle, but also among the fibers inside the fiber bundle, thereby providing an advantage of enhancing impregnation property.

In particular, when the particles of both the first component and the second component are small-sized fine particles, both components also enter among the respective single fibers constituting the fiber bundle, and it becomes possible to realize more uniform sizing treatment.

On the other hand, it is also preferred that large-sized particles having a $D_{50}$ of 1 μm or more as a particle size are contained as the first component or the second component, in addition to the small-sized particles as described above. By mixing such large-sized particles, it becomes easy to increase the amount of the sizing agent adhered to the fibers, resulting in more easy impregnation of the resin at the time of finally forming the composite material. However, when the particle size is excessively large, the particle size becomes too large to the fiber used, and it becomes difficult to keep the particles on the fibers in the subsequent steps.

Thus, conversely, there is a tendency that the sufficient adhered amount cannot be secured, so that the size is preferably 20 μm or less. Further, when the size is too large, uniform adhesion to the fiber surfaces tends to become difficult.

As described above, when both the particle sizes of the first component and the second component in the sizing liquid used in the invention are small, the particles are uniformly adhered in the inside of the fiber bundle and on the surface thereof. This is particularly preferred in terms of quality. On the other hand, by increasing the particle size of the first component that does not melt, it becomes possible to increase the adhered amount to increase the component that contributes at the time of resin impregnation in which the treatment is performed at a higher temperature than the drying temperature. Finally, it becomes possible to obtain the composite that is stable in quality. Further, by increasing the particle size of the second component conversely having fluidity at high temperature, it becomes possible to perform more stable production. This is because at ordinary temperature such as at the time of imparting the sizing liquid, the existing amount of the second component before fluidity appears outside the fiber bundle are increased, and thereafter, the second component is melted by heat at the time of drying to exhibit fluidity, thereby stably coating the fiber bundle with the second component.

Further, the sizing liquid used in the manufacturing method of the invention is preferably used as an aqueous dispersion. Such a sizing liquid (dispersion) constituted by the sizing agent and water is preferably a uniform dispersion. As the specific preferred amount ratios of the respective components, the first component is preferably from 1 to 30 parts by weight, and the second component is preferably from 0.01 to 6 parts by weight, based on 100 parts by weight of a solvent of the sizing liquid. Further, based on 100 parts by weight of the solvent of the sizing liquid, the first component is more preferably from 1 to 16 parts by weight and particularly preferably from 2 to 8.5 parts by weight, and the second component is more preferably from 0.1 to 3 parts by weight and particularly preferably from 0.2 to 1.5 parts by weight.

A method for imparting the sizing liquid to the surface of the carbon fiber bundle is not particularly limited, as long as it is a method of uniformly applying the sizing liquid to the surface of the carbon fiber bundle. Preferred methods thereof include, for example, a spray method, a roller dipping method, a roller transfer method and the like. These may be used either alone or as a combination thereof. Of these sizing methods, the roller dipping method is preferred, from the viewpoints of productivity and uniformity. More specifically, when the carbon fiber strand is dipped in an aqueous emulsion or solution, opening and squeezing are preferably repeated through dipping rollers mounted in an emulsion bath to impregnate the aqueous emulsion or solution into the strand. Adjustment of the amount of the sizing liquid adhered to the carbon fiber bundle can be performed by concentration adjustment of the sizing liquid, adjustment of distance between squeezing rollers, or the like.

In the method for manufacturing a reinforcing carbon fiber bundle of the invention, the carbon fiber bundle is dried after the sizing liquid is imparted to the surface of the fiber bundle. Water is removed by drying treatment from the carbon fiber bundle to which the sizing liquid has been imparted. Further, it is also a preferred method to supplementarily perform steps such as air drying and centrifugation, as well as the drying treatment, in the steps before and after the drying treatment.

In the method for manufacturing a reinforcing carbon fiber bundle of the invention, by employing the heat treatment step in the drying treatment step, in addition to remove water from the carbon fiber bundle after the sizing treatment, the surfaces of the carbon fibers are uniformly wetted with the sizing liquid, thereby being able to disperse the agent components. As means for the heat treatment, there can be used, for example, hot air, a hot plate, a hot roller, an infrared heater and the like. At this time, in order to adjust the water amount of the resulting carbon fiber bundle to the desired range, it is preferably to control the heat treatment temperature or the heat treatment time. Usually, a heat treatment temperature of about 150° C. is used, so that as the sizing agent used in the method for manufacturing a reinforcing carbon fiber bundle of the invention, it is preferred that specifically the melting point of the first component is 150° C. or more, and the melting point of the second component is less than 150° C.

Further, particularly, when the sizing liquid is the aqueous emulsion, water is preferably removed at a drying temperature of about 60° C. to 150° C. Within this temperature region, the desired carbon fiber bundle can be obtained without deteriorating the many resins in the sizing liquid and therefore the carbon fiber bundle. Further, the heat treatment temperature is preferably a temperature lower than the heat decomposition temperature of the agent in the sizing liquid to be used. Furthermore, another heat treatment may be given to the carbon fiber bundle after the drying step.

Generally, the drying temperature in the manufacturing method of the invention is preferably within a range of 100° C. to 150° C. Further, the drying time is preferably from 1 minute to 10 minutes. When the drying temperature is too high, the first component melts to cause a tendency of disrupting the granular form. Conversely, when the drying temperature is too low, the fiber bundle is not dried, or the second component does not melt to cause a tendency of forming the fiber bundle having no bundling properties. By imparting the sizing liquid and performing the heat treatment, there is formed the fiber bundle to which the sizing agent is sufficiently adhered.

The reinforcing carbon fiber bundle obtained by such a manufacturing method is used as it is in the case used as long fibers, and is cut to a predetermined length to use in the case used as short fibers. It is also possible to perform a cutting step before imparting the sizing agent, but it is preferred to perform after imparting the sizing agent in terms of productivity.

Then, the composite constituted by the reinforcing carbon fiber bundle of the invention and the resin has high physical properties. In particular, the resin is preferably a thermoplastic resin, and has extremely high performance. Generally, when the thermoplastic resin is used as the matrix resin of the carbon fiber reinforced composite, there has been a problem of poor compatibility between the resin and the sizing agent. However, in the reinforcing carbon fiber bundle of the invention, the first component (generally, high melting particles) that does not melt is present on the surface thereof, and the second component having fluidity, which spreads on the fiber surfaces together with the first component keeping its solid state (granular form) is present on the fiber bundle. Impregnation property of the matrix resin into the reinforcing carbon fiber bundle is extremely increased thereby. As a result, the resulting composite has high physical properties.

In particular, when an engineering plastic resin (for example, a polyamide, a polyester, a polycarbonate or the like) having excellent physical properties is used as the thermoplastic resin, it has been difficult to perform impregnation thereof. This is because impregnation or molding is usually performed between the melting point and decomposition temperature of the thermoplastic resin and the thermoplastic resin has high melting point. However, by using the reinforcing carbon fiber bundle of the invention, it has become possible to perform sufficient impregnation of the matrix resin.

It is possible to obtain such a composite by press molding a mixture constituted by the above-mentioned reinforcing carbon fiber bundle of the invention and the resin, which is still another one of the invention. The press molding temperature is preferably 150° C. or more, or a temperature equivalent to or more than the melting point of the first component. When the high molding temperature is employed at the time of press, the high melting first component in the granular form melts and is integrated with the matrix resin, together with the second component of the low melting sizing component, thereby molding the composite having higher physical properties.

The matrix resin used in the composite of the invention is preferably the thermoplastic resin. In particular, a polyamide-based resin is preferred. As specific examples of the polyamide-based resins, there are preferably used polyamide resins having as a structure unit at least one selected from the group consisting of $-[NH(CH_2)_5CO]-$, $-[NH(CH_2)_6NHCO(CH_2)_4CO]-$, $-[NH(CH_2)_6NHCO(CH_2)_8CO]-$, $-[NH(CH_2)_{10}CO]-$, $-[NH(CH_2)_{11}CO]-$ and $-[NH(CH_2)_2NHCO-D-CO]-$ (wherein D represents an unsaturated hydrocarbon having 3 to 4 carbon atoms). Specific examples thereof include 6-nylon, 66-nylon, 610-nylon, 11-nylon, 12-nylon, 6/66 copolymer nylon, 6/610 copolymer nylon, 6/11 copolymer nylon, 6/12 copolymer nylon, 6/66/11 copolymer nylon, 6/66/12 copolymer nylon, 6/66/11/12 copolymer nylon, 6/66/610/11/12 copolymer nylon, dimer acid-based polyamide resins and the like. These polymers or copolymers may be either alone or a mixture of two or more thereof.

Further, it is also preferred to incorporate inorganic fillers into the above-mentioned resins. The inorganic fillers include talc, calcium silicate, wollastonite, montmorillonite and various inorganic nanofillers. Furthermore, other additives conventionally incorporated into polyolefin compositions, such as heat-resistant stabilizers, antistatic agents, weather-resistant stabilizers, light-resistant stabilizers, anti-aging agents, preservatives, softening agents, dispersing agents, fillers, coloring agents and lubricants, may be incorporated into the above-mentioned resins, as needed.

In addition, the reinforcing carbon fiber bundle used in the composite is preferably constituted by short fibers or long fibers. In the case of the short fibers, an isotropic composite such as a nonwoven fabric can be formed. In the case of long fibers, strength characteristics of the reinforcing fiber can be fully exerted as a unidirectional material.

Further, specifically, when the reinforcing carbon fiber bundle is constituted by the short fibers, it is also preferred that the composite is formed by using a mixture constituted by such reinforcing short fibers and the resin having a form of a granular material or a film-formed material. Incidentally, when the resin is the granular material herein, various forms such as fibrous, powdery and acicular materials may be taken. Furthermore, when the reinforcing carbon fiber bundle is constituted by the long fibers, the composite can be formed by conventional known methods.

Preferred forms of the composite using the reinforcing carbon fiber bundle include, for example, random mats, uniaxially-aligned carbon fiber composite materials, carbon fiber woven fabric-reinforced composite materials and the like, which are described in detail later.

Further, the composite material may contain various additives within a range not impairing the object of the invention. The additives include, for example, surfactants. Furthermore, carbon fiber single fibers or one or more kinds of thermoplastic resins may be used together as materials contained in addition to the opened or unopened carbon fiber bundle.

Preferred examples of the composites using such reinforcing carbon fiber bundles include, for example, a random mat.

At this time, the average fiber length of the reinforcing carbon fiber bundle of the invention used in the random mat is preferably within a range of 2 to 100 mm, more preferably from 15 to 80 mm, and still more preferably within a range of 20 to 60 mm. Further, one of these fiber lengths or a combination of two or more thereof may be used to form it.

In order to randomly arrange the reinforcing carbon fibers, the carbon fiber bundle is preferably opened. The random mat is constituted by the short fibers obtained from the carbon fiber bundle and the resin, preferably the thermoplastic resin, and it is preferred that the carbon fibers are oriented substantially randomly in plane. As used herein, "oriented substantially randomly in plane" means a state where the carbon fibers are present approximately in parallel with a mat plane, namely a front surface and a rear surface, and are not oriented in a direction perpendicular to the mat plane. In this way, the carbon fibers are oriented randomly in a two-dimensional direction in plane, thereby more effectively exerting a reinforcing effect of the carbon fibers in a direction of the mat plane without anisotropy.

The existing amount of the thermoplastic resin in the random mat is preferably from 10 to 500 parts by weight based on 100 parts by weight of the carbon fibers. More preferably, it is from 20 to 400 parts by weight. The thermoplastic resin is preferably a granular or film-formed material. When the resin is the granular material herein, various forms such as fibrous, powdery and acicular materials may be taken.

Such a random mat using the carbon fiber bundle of the invention can be produced, for example, through the following specific steps:

1. A step of cutting the above-mentioned carbon fiber bundle.
2. A step of opening the cut carbon fiber bundle by blowing air to the fibers, or the like.
3. A coating step of spreading the opened carbon fibers and applying the thermoplastic resin thereto at the same time.
4. A step of fixing the coated carbon fibers and the thermoplastic resin.

In this step 3, other than spraying the thermoplastic resin at the same time, only the carbon fibers may be sprayed and allowed to cover a thermoplastic resin film having a thickness of 10 μm to 300 μm, or a method of impregnating the carbon fibers with the molten thermoplastic resin is also preferred.

It is preferred to form a random mat containing a specific number or more of the carbon fiber bundles, in which the degree of opening of the carbon fibers in the thermoplastic resin matrix is controlled, and other opened carbon fibers at a specific ratio. According to the manufacturing method of the invention, it is possible to properly control the rate of opening, and random mats suitable for various applications and purposes can be provided.

For example, the carbon fiber bundle is cut to 20 mm, introduced into a taper tube having a carbon fiber input port diameter of 20 mm, a blowout port diameter of 55 mm and a tube length of 400 mm from the input port to the blowout port, and sprayed by flowing compressed air so that the pressure of the compressed air introduced into the taper tube is 0.25 MPa, thereby being able to obtain the random mat. By preparing the proper random mat, it becomes possible to more closely adhere to the carbon fibers and the thermoplastic resin to each other to achieve high physical properties.

This is because the reinforcing carbon fiber bundle of the invention contains the first component that can contribute to impregnation and does not melt in the fiber bundle, different from conventional ones, so that the excellent effect of impregnation property is produced even in molding at the same temperature and pressure as conventional ones. At the same time, in spite of high bundling properties of the fibers, the fiber bundle is not excessively hard, so that the excellent effect of enhancing opening of the fibers in the above-mentioned random mat formation is produced.

Further, it is preferred that after the random mat as described above is once molded, one or a plurality thereof stacked are further pressurized to form the composite constituted by the carbon fiber bundle and the matrix resin. As conditions at the time when pressurized at this time, it is preferred that the random mat or mats are previously heated to a temperature equivalent to or more than the melting point of the matrix resin, and that a mold for pressurization is a cold press having a temperature less than the melting point of the matrix resin.

Furthermore, other than the above-mentioned random mat, it is also possible to form the composite with the matrix resin using long fibers as the reinforcing carbon fiber bundle.

For example, by arranging the reinforcing carbon fiber bundles of the invention and bringing them into contact with the molten thermoplastic resin, the uniaxially-aligned carbon fiber composite material can be obtained in which the carbon fiber bundles and the thermoplastic resin are composited. In this case, the thermoplastic resins previously described can be used, and particularly, the polyamide resin is preferred. For the uniaxially-aligned carbon fiber composite material, the plurality of uniaxially-aligned carbon fiber composite materials may be layered.

There is no particular limitation on a method for manufacturing the uniaxially-aligned carbon fiber composite material layer, and it can be obtained, for example, by a pultrusion method or the like. In the case of using the pultrusion method, one in which the carbon fibers are impregnated with the thermoplastic resin is suitably obtained. In the case of one in which impregnation with the thermoplastic resin is suppressed, namely a semi-impregnated layer, it can be preferably obtained, for example, by a method of arranging the carbon fibers in one direction on a sheet constituted by the thermoplastic resin, followed by heating with pressing as needed, or the like.

The form of the composite material finally obtained is preferably columnar or prismatic. It is also preferred that the carbon fiber bundles are solidified with the thermoplastic resin to obtain strands, which are cut, thereby obtaining long fiber pellets constituted by the carbon fibers and the thermoplastic resin, followed by performing molding therefrom. Further, it is also preferred to be a sheet form thinned in height (thickness). In the case of the sheet form, the thickness thereof is preferably from 40 to 3000 µm.

Such a composite using the reinforcing carbon fiber bundle of the invention has an advantage of increasing impregnation property, different from the case of using conventional reinforcing fibers. Then, the composite material using the carbon fiber bundle of the invention becomes the carbon fiber-reinforced thermoplastic resin composite material excellent in mechanical strength. In particular, when heat melting is performed at the time of molding the composite material, the thermoplastic resin can be rapidly impregnated into the inside of the fiber strand, so that it becomes possible to increase the physical properties and to shorten the molding step time at the same time. This is particularly preferred.

EXAMPLES

The invention is described with reference to examples in more details below. However, the following examples should not be construed as limiting the invention. Incidentally, the examples of the invention are evaluated by methods shown below.

<Adhered Amount of Sizing Agent>

Two 1.0 m carbon fiber bundles subjected to sizing treatment were collected as samples. Then, these were placed in an alumina crucible, and the temperature thereof was increased from ordinary temperature to 550° C. in a furnace whose inside was replaced to a nitrogen atmosphere, followed by burning for further 10 minutes after arrival at 550° C. The amount decreased in weight by burning of the carbon fiber bundles at this time was defined as the adhered amount of a sizing agent. Specifically, the average of values calculated according to the following formula (2) was defined as the adhered amount of the sizing agent.

$$\text{Adhered amount of sizing agent} = (a-b)/b \times 100\ [\%] \quad (2)$$

a: Weight of carbon fiber bundle before burning treatment [g]
b: Weight of carbon fiber bundle after burning treatment [g]

<Method for Measuring Amounts of First Component and Second Component Adhered to Carbon Fiber Bundle>

There was prepared a dispersion containing only the second component in the same concentration as the sizing agent tested and containing no first component, and a carbon fiber bundle whose weight was previously measured was sized therewith. A sample was collected as it was undried (as it was wet) and placed in a vessel whose weight was previously measured with a scale measurable to 4 decimal places, followed by sufficient drying in a natural convection type drier of 105° C. for 60 minutes. Thereafter, the weight of the sample was measured, and the value obtained by subtracting the weight of the carbon fiber bundle therefrom was defined as the adhered amount of the second component. The value obtained by subtracting the above-mentioned adhered amount of the second component from the adhered amount of the sizing agent calculated according to the above-mentioned formula (2).

<Thickness of Molded Plate>

The thickness of a plate of a composite molded was measured at 8 points using a micrometer, and the average value thereof was calculated.

<Measurement of Melting Point>

When measurement was made using a differential scanning calorimeter ("DSC220" manufactured by Seiko Electronics Industrial Co., Ltd.) (temperature range: −150° C. to 725° C.) at a rate of temperature increase of 10° C./min from 30° C., the detected value of a crystal melting endothermic peak was defined as the melting point.

<Particle Size>

The value of $D_{50}$ (50% cumulative particle size) in particle size measurement with a laser diffraction particle size analyzer (manufactured by Horiba, Ltd., a laser diffraction/scattering particle size analyzer "LA-950") was defined as the particle size.

<Measurement of Decomposition Temperature>

When measurement was made in air at a rate of temperature increase of 10° C./min from 30° C. to 400° C. using a differential thermal and thermogravimetric simultaneous measuring apparatus ("TG/DTA320" manufactured by Seiko Electronics Industrial Co., Ltd.) (temperature range: room temperature to 1500° C.), the temperature at which a decrease in weight showed 5% was defined as the decomposition temperature.

<Measurement of Melt Viscosity>

The melt viscosities of the first component and the second components were evaluated using a capillary rheometer (manufactured by Toyo Seiki Seisaku-sho, Ltd., "CAPILOGRAPH 1D"). Incidentally, measurement was made using a capillary with a diameter of 0.5 mm and a length of 5 mm.

<Fiber Volume Content (Vf)>

The density in water of a carbon fiber composite material molded plate cut to 15 mm square was measured. Then, it was placed in an alumina crucible, which was placed in a muffle furnace heated at 550° C., for 30 minutes to decompose a matrix resin. The fiber volume content was measured by measuring the weights before and after the decomposition.

<Texture Value>

The texture value (hardness) of a carbon fiber bundle was measured in accordance with JIS L-1096, E method (HANDLE-O-Meter method) using a HANDLE-O-Meter ("HOM-200" manufactured by Daiei Kagaku Seiki Mfg. Co., Ltd.). Three carbon fiber bundles with 1.5 cm in specimen width×10 cm (L) were collected, and placed on a test stand with a slit width of 15 mm. The resistance force (g) generated at the time when the specimen was pushed into a groove to a constant depth (8 mm) with a blade was measured, thereby measuring the hardness. This value was defined as the texture value of the carbon fiber bundle.

<Impregnation Rate by Ultrasonic Flaw Detection Method (C-scan)>

Using a measuring apparatus by an ultrasonic flaw detection method (manufactured by Krautkramer Japan Co., Ltd., "SDS-WIN"), to a molded plate in the invention, in an ultrasonic two-dimensional mapping image of 37 dB, the rate that the degree of impregnation was 70% or more of all the surface area was defined as the impregnation rate.

Example 1

(Preparation of Emulsion Solution Containing Second Component)

A nylon 6/nylon 66/nylon 12 (weight ratio: 45/15/40) ternary copolymer polyamide resin having a particle size ($D_{50}$) of 0.4 μm, a melting point of 130° C. and a glass transition temperature of 25° C. was prepared as a second component of a sizing agent. Incidentally, this melting point is the melting maximum peak temperature at the time when measurement was made using a differential scanning calorimeter (manufactured by Seiko Electronics Industrial Co., Ltd., "DSC220") at a rate of temperature increase of 10° C./min. Further, the melt viscosity at 150° C. of this resin was 200 Pa·s (measurement conditions: shear rate 10 $s^{-1}$).

Incidentally, when the shear rate was changed to 1000 $s^{-1}$, changing the measurement conditions, the melt viscosity was 15 Pa·s.

Into an autoclave equipped with a stirrer, 120 g of this ternary copolymer polyamide resin, 179.6 g of water and 0.4 g of sodium hydroxide were added, and the temperature was increased to 150° C. while keeping a state of a rotation number of 500 rpm. The reaction was conducted for 30 minutes in a state where the temperature reached 150° C. After termination of the reaction, a reaction product was cooled to 50° C. as such, and an aqueous dispersion of the polyamide resin was taken out. The resin concentration of the resulting aqueous dispersion of the polyamide resin was 40 parts by weight based on 100 parts by weight of the aqueous dispersion.

Finally, 75 g of the resulting aqueous dispersion of the polyamide resin was mixed with 12.0 g of an ammonium salt aqueous solution (the degree of neutralization with ammonia: 0.75) of an ethylene-acrylic acid copolymer (manufactured by Dow Chemical Company, "PRIMACOR 5980I", acrylic acid-modified amount: 20% by weight) to obtain an aqueous dispersion of a polyamide resin composition, the ammonium salt aqueous solution having been separately prepared so as to have a concentration of 25% by weight.

Stirring was performed so as to finally contain 15 parts by weight of the copolymer polyamide as the second component and 1.2 parts by weight of the ethylene-acrylic acid copolymer, based on 1000 parts by weight of water to obtain an emulsion solution for the sizing agent.

(Preparation of Sizing Agent)

A urethane resin emulsion (containing a urethane resin, particle size ($D_{50}$): 3.3 μm, mainly constituted by polyurethane, melting point: 180° C., glass transition temperature: 35° C.) was added as a first component to the resulting emulsion solution (containing the second component) so as to contain 250 parts by weight based on 1000 parts by weight of water, followed by stirring until dispersed to prepare an emulsion solution for the sizing agent. Incidentally, this urethane resin component of the first component was in a solid state at 150° C., and had no fluidity. The melt viscosity could not be measured.

(Preparation of Carbon Fiber Bundle)

An unsized carbon fiber strand (manufactured by Toho Tenax Co., Ltd., "Tenax STS-24K N00", diameter 7 μm×24000 filaments, fineness: 1.6 g/m, tensile strength: 4000 MPa (408 kgf/mm$^2$), tensile modulus: 238 GPa (24.3 ton/mm$^2$) was continuously immersed in the resulting emulsion solution for the sizing agent with stirring in a sizing bath to impregnate the emulsion solution for the sizing agent among filaments.

This was allowed to pass through a drying furnace of 130° C. for about 120 seconds to perform drying and heat treatment, thereby obtaining a carbon fiber bundle having a width of about 12 mm. The adhered amount of the whole sizing agent in the resulting carbon fiber bundle was 12.0 parts by weight based on 100 parts by weight of the carbon fibers. The first component results in 11.5 parts by weight, and the second component results in 0.55 parts by weight (in which the copolymer polyamide is 0.5 parts by weight). Further, the texture value of this carbon fiber bundle was measured. As a result, it was 45, and approximately equal to the value in a system in which the first component was not imparted and only the second component was imparted.

(Preparation of Composite (Uniaxially-Aligned Carbon Fiber Composite)

Subsequently, the resulting carbon fiber bundle was arranged in one direction while rubbing it with a round bar into a sheet form, and polyamide 6 films ("Emblem" manufactured by Unitika Ltd., 25 μm-thick film, melting point: 230° C.) were placed on upper and lower surfaces of the sheet so as to contain 100 parts by volume of the polyamide 6 resin based on 100 parts by volume of the carbon fibers. Then, a pressure of 2.5 MPa was applied thereto with a hot press of 260° C. to obtain a uniaxially-aligned carbon fiber composite material sheet. The carbon fiber areal weight of the uniaxially-aligned carbon fiber composite material sheet was 100 g/m², and 18 sheets thereof were stacked in one direction and heated at 3.0 MPa for 15 minutes with a press apparatus heated to 260° C., followed by slow cooling, thereby obtaining a molded plate (carbon fiber composite material). The thickness of the molded plate was 1.75 mm, and the fiber volume content (Vf) thereof was 49%. Further, the impregnation rate obtained from the measurement by two-dimensional mapping (C-scan) of the ultrasonic flaw detection method was 82%.

(Preparation of Composite (Random Mat))

Then, using the resulting carbon fiber bundle, an isotropic carbon fiber composite material (random mat) was prepared. Carbon fibers obtained by cutting the carbon fiber bundle to 16 mm and a polyamide 6 resin (nylon 6 resin powder, "A1030FP" manufactured by Unitika Ltd., melting point: 230° C.) were introduced into a taper tube, setting the supply amount of the carbon fibers to 450 g/min and the supply amount of the polyamide 6 resin to 480 g/min. The carbon fibers were scattered, together with the polyamide 6 resin, on a table provided under an outlet of the taper tube, while blowing air to the carbon fibers in the taper tube to partially open the fiber bundle. The scattered carbon fibers and polyamide 6 resin were sucked with a blower from a lower portion of the table, and fixed to obtain a carbon fiber random mat with a thickness of about 5 mm in an unmolded stage.

The resulting carbon fiber random mat was heated at 3 MPa for 5 minutes with a press apparatus heated to 260° C. to obtain a carbon fiber random mat composite material molded plate (random mat carbon fiber composite) having an areal weight of 2800 g/m², a thickness of 1.98 mm and a fiber volume content (Vf) of 41% by volume. Further, the impregnation rate obtained from the measurement by two-dimensional mapping (C-scan) of the ultrasonic flaw detection method was 88%. The bending strength of the resulting molded plate was measured. As a result, a good physical property value can be obtained.

Comparative Example 1

An emulsion solution for a sizing agent was prepared in the same manner as in Example 1 with the exception that only the second component was added without using the first component.

Then, a carbon fiber bundle to which the sizing agent had been imparted in the same manner as in Example 1 was dried to obtain a carbon fiber bundle having a width of about 11 mm. The adhered amount of the whole sizing agent in the resulting carbon fiber bundle was 0.55 parts by weight (in which the ternary copolymer polyamide was 0.5 parts by weight) based on 100 parts by weight of the carbon fibers. This is the adhered amount of only the second component. Further, the texture value of this carbon fiber bundle was measured. As a result, it was 55.

Subsequently, a uniaxially-aligned carbon fiber composite was obtained in the same manner as in Example 1. The thickness of the molded plate was 1.72 mm, and the fiber volume content (Vf) thereof was 48%. Further, the impregnation rate obtained from the measurement by two-dimensional mapping (C-scan) of the ultrasonic flaw detection method was 65%, resulting in a low value, compared to the above-mentioned Example in which the first component was added.

Further, a random mat carbon fiber composite (isotropic carbon fiber composite material) was obtained in the same manner as in Example 1. The carbon fiber random mat composite material molded plate having a thickness of 1.95 mm and a fiber volume content (Vf) of 41% by volume was obtained. Further, the impregnation rate obtained from the measurement by two-dimensional mapping (C-scan) of the ultrasonic flaw detection method was 67%, resulting in a low value, compared to the above-mentioned Example in which the first component was added. Furthermore, the bending strength of the molded plate also resulted in a low value, compared to the above-mentioned Example.

Comparative Example 2

An emulsion solution for a sizing agent was prepared in the same manner as in Example 1 with the exception that only the polyurethane resin emulsion of the first component was added without using the second component.

Then, a carbon fiber bundle to which the sizing agent had been imparted in the same manner as in Example 1 was dried to obtain a carbon fiber bundle having a width of about 11 mm. The adhered amount of the whole sizing agent in the resulting carbon fiber bundle was 5.5 parts by weight based on 100 parts by weight of the carbon fibers. This is the adhered amount of only the first component. Further, the texture value of this carbon fiber bundle was measured. As a result, it was 8, and bundling properties were extremely low.

Subsequently, a uniaxially-aligned carbon fiber composite was obtained in the same manner as in Example 1. The thickness of the molded plate was 1.76 mm, and the fiber volume content (Vf) thereof was 48%. Further, the impregnation rate obtained from the measurement by two-dimensional mapping (C-scan) of the ultrasonic flaw detection method was 48%, resulting in a low value, compared to the above-mentioned Example in which the second component was added.

Further, a random mat carbon fiber composite (isotropic carbon fiber composite material) was obtained in the same manner as in Example 1. The carbon fiber random mat composite material molded plate having a thickness of 2.2 mm and a fiber volume content (Vf) of 37% by volume was obtained. Furthermore, the impregnation rate obtained from the measurement by two-dimensional mapping (C-scan) of the ultrasonic flaw detection method was 59%, resulting in a low value, compared to the above-mentioned Example in which the second component was added. Furthermore, the bending strength of the molded plate also resulted in a low value, compared to the above-mentioned Example.

TABLE 1

|  | Example 1 | Comparative Example 1 | Comparative Example 2 |
| --- | --- | --- | --- |
| First Component | Polyurethane | — | Polyurethane |
| State at 150° C. | Not melt (solid) | — | Not melt (solid) |
| Particle Size $D_{50}$ μm | 3.3 | — | 3.3 |
| Adhered Amount wt % | 11.5 | — | 5.5 |

TABLE 1-continued

|  |  | Example 1 | Comparative Example 1 | Comparative Example 2 |
|---|---|---|---|---|
| Second Component State at 150° C. |  | Polyamide Flowable (melt) | Polyamide Flowable (melt) | — |
| Adhered Amount |  | 0.5 | 0.5 | — |
| Fiber Bundle Texture |  | 45 | 55 | 8 |
| Matrix Resin of Composite |  | Polyamide | Polyamide | Polyamide |
| Uniaxially-Aligned | Impregnation Rate % | 82 | 65 | 48 |
| Random Web | Impregnation Rate % | 88 | 67 | 59 |

Example 2

An emulsion solution for a sizing agent was prepared in the same manner as in Example 1 with the exception that the first component was changed from the urethane resin emulsion to a polyamide resin (sponge-like nylon powder, manufactured by Metal Color Co., Ltd., SNP613N, particle size ($D_{50}$): 13 µm, main component: PA6, melting point: 230° C., glass transition temperature: 50° C.). Incidentally, the first component was added so as to contain 250 parts by weight based on 1000 parts by weight of water, followed by stirring until dispersed. Incidentally, this polyamide resin (sponge-like nylon powder) of the first component was in a solid state at 150° C., and had no fluidity. The melt viscosity was not able to be measured.

Then, a carbon fiber bundle to which the sizing agent had been imparted in the same manner as in Example 1 was dried to obtain a carbon fiber bundle having a width of about 12 mm. The adhered amount of the whole sizing agent in the resulting carbon fiber bundle was 13.9 parts by weight based on 100 parts by weight of the carbon fibers. The first component results in 13.2 parts by weight, and the second component results in 0.65 parts by weight (in which the copolymer polyamide is 0.6 parts by weight). Further, the texture value of this carbon fiber bundle was measured. As a result, it was 52, and approximately equal to the value in a system of only the second component without imparting the first component.

Subsequently, a uniaxially-aligned carbon fiber composite was obtained in the same manner as in Example 1. The thickness of the molded plate was 1.73 mm, and the fiber volume content (Vf) thereof was 49%. Further, the impregnation rate obtained from the measurement by two-dimensional mapping (C-scan) of the ultrasonic flaw detection method was 92%.

Further, a random mat carbon fiber composite (isotropic carbon fiber composite material) was obtained in the same manner as in Example 1. The carbon fiber random mat composite material molded plate (random mat carbon fiber composite) having a thickness of 1.98 mm and a fiber volume content (Vf) of 42% by volume was obtained. Furthermore, the impregnation rate obtained from the measurement by two-dimensional mapping (C-scan) of the ultrasonic flaw detection method was 82%. The bending strength of the resulting molded plate was measured. As a result, a good physical property value was able to be obtained.

Example 3

An emulsion solution for a sizing agent was prepared in the same manner as in Example 1 with the exception that the first component was changed to a polyamide resin emulsion (containing a polyamide resin, particle size ($D_{50}$): 1.6 µm, melting point: 200° C., glass transition temperature: 45° C.). Incidentally, this polyamide resin of the first component was in a solid state at 150° C., and had no fluidity. The melt viscosity could not be measured. Incidentally, the first component was added so as to contain 250 parts by weight based on 1000 parts by weight of water, followed by stirring until dispersed.

Then, a carbon fiber bundle to which the sizing agent had been imparted in the same manner as in Example 1 was dried to obtain a carbon fiber bundle having a width of about 12 mm. The adhered amount of the whole sizing agent in the resulting carbon fiber bundle was 12.8 parts by weight based on 100 parts by weight of the carbon fibers. The first component results in 12.2 parts by weight, and the second component results in 0.55 parts by weight (in which the copolymer polyamide is 0.5 parts by weight). Further, the texture value of this carbon fiber bundle was measured. As a result, it was 46, and approximately equal to the value in a system in which only the second component was imparted.

Subsequently, a uniaxially-aligned carbon fiber composite was obtained in the same manner as in Example 1. The thickness of the molded plate was 1.73 mm, and the fiber volume content (Vf) thereof was 49%. Further, the impregnation rate obtained from the measurement by two-dimensional mapping (C-scan) of the ultrasonic flaw detection method was 89%.

Further, a random mat carbon fiber composite (isotropic carbon fiber composite material) was obtained in the same manner as in Example 1. The carbon fiber random mat composite material molded plate having a thickness of 2.00 mm and a fiber volume content (Vf) of 42% by volume was obtained. Furthermore, the impregnation rate obtained from the measurement by two-dimensional mapping (C-scan) of the ultrasonic flaw detection method was 79%.

Example 4

An emulsion solution for a sizing agent was prepared in the same manner as in Example 3 with the exception that the compounding ratio of the polyamide resin emulsion of the first component and the ternary copolymer polyamide of the second component was changed. They were added so as to finally contain 30 parts by weight of the first component and 15 parts by weight of the second component, based on 1000 parts by weight of water.

Then, a carbon fiber bundle to which the sizing agent had been imparted in the same manner as in Example 3 was dried to obtain a carbon fiber bundle having a width of about 11 mm. The adhered amount of the whole sizing agent in the resulting carbon fiber bundle was 2.5 parts by weight based on 100 parts by weight of the carbon fibers. The first component results in 1.8 parts by weight, and the second component results in 0.65 parts by weight (in which the copolymer polyamide is 0.6 parts by weight). Further, the texture value of this carbon fiber bundle was measured. As a result, it was 46.

Subsequently, a uniaxially-aligned carbon fiber composite was obtained in the same manner as in Example 3. The thickness of the molded plate was 1.75 mm, and the fiber volume content (Vf) thereof was 49%. Further, the impregnation rate obtained from the measurement by two-dimensional mapping (C-scan) of the ultrasonic flaw detection method was 71%, resulting in a slightly low value, compared to the above-mentioned Example 3 in which the first component was added in a large amount.

Further, a random mat carbon fiber composite (isotropic carbon fiber composite material) was obtained in the same manner as in Example 3. The carbon fiber random mat composite material molded plate having a thickness of 2.2 mm and a fiber volume content (Vf) of 37% by volume was obtained. Further, the impregnation rate obtained from the measurement by two-dimensional mapping (C-scan) of the ultrasonic flaw detection method was 68%, resulting in a slightly lower value than in other Examples in which the first components were added in large amounts. The bending strength of the resulting molded plate was measured. As a result, it was a slightly lower value than in other Examples.

Example 5

An emulsion solution for a sizing agent was prepared in the same manner as in Example 1 with the exceptions that the first component was changed to an emulsion mainly constituted by a polyamide having a particle size ($D_{50}$) of 0.4 μm and a melting point of 160° C. (a glass transition temperature of 38° C.) and that the second component was changed to an emulsion of a nylon 6/ nylon 66/ nylon 12 (weight ratio: 25/15/60) ternary copolymer polyamide resin having a particle size ($D_{50}$) of 2.8 μm and a melting point of 120° C. (a glass transition temperature of 30° C.). Incidentally, this polyamide resin of the first component was in a solid state at 150° C., and had no fluidity. The melt viscosity could not be measured. On the other hand, the melt viscosity at 150° C. of the ternary copolymer polyamide resin of the second component was 180 Pa·s (measurement conditions: shear rate 10 $s^{-1}$). Incidentally, when the shear rate was changed to 1000 $s^{-1}$, changing the measurement conditions, the melt viscosity was 12 Pa·s. Then, the first component was added so as to contain 250 parts by weight based on 1000 parts by weight of water, followed by stirring until dispersed to use.

Then, a carbon fiber bundle to which the sizing agent had been imparted in the same manner as in Example 1 was dried at a drying temperature of 160° C. for 120 seconds to obtain a carbon fiber bundle having a width of about 12 mm. The adhered amount of the whole sizing agent in the resulting carbon fiber bundle was 8.4 parts by weight based on 100 parts by weight of the carbon fibers. The content of the first component is 8.1 parts by weight, and the content of second component is 0.3 parts by weight. Further, the texture value of this carbon fiber bundle was measured. As a result, it was 55, and approximately equal to the value in a system in which only the second component was imparted.

Subsequently, a uniaxially-aligned carbon fiber composite was obtained in the same manner as in Example 1. The thickness of the molded plate was 1.76 mm, and the fiber volume content (Vf) thereof was 50%. Further, the impregnation rate obtained from the measurement by two-dimensional mapping (C-scan) of the ultrasonic flaw detection method was 90%.

Further, a random mat carbon fiber composite (isotropic carbon fiber composite material) was obtained in the same manner as in Example 1. The carbon fiber random mat composite material molded plate having a thickness of 1.98 mm and a fiber volume content (Vf) of 40% by volume was obtained. Furthermore, the impregnation rate obtained from the measurement by two-dimensional mapping (C-scan) of the ultrasonic flaw detection method was 90%. The bending strength of the resulting molded plate was measured. As a result, a good physical property value was able to be obtained.

Example 6

An emulsion solution for a sizing agent was prepared in the same manner as in Example 1 with the exceptions that the first component was changed to an emulsion mainly constituted by a polyamide having a particle size ($D_{50}$) of 0.4 μm and a melting point of 160° C. (a glass transition temperature of 38° C.) and that the second component was changed to an emulsion mainly constituted by a polyamide having a particle size ($D_{50}$) of 0.3 μm and a melting point of 120° C. (a glass transition temperature of 30° C.). Incidentally, the first component was added so as to contain 250 parts by weight based on 1000 parts by weight of water, followed by stirring until dispersed.

Then, a carbon fiber bundle to which the sizing agent had been imparted in the same manner as in Example 1 was dried to obtain a carbon fiber bundle having a width of about 12 mm. The adhered amount of the whole sizing agent in the resulting carbon fiber bundle was 6.0 parts by weight based on 100 parts by weight of the carbon fibers. The content of the first component is 5.5 parts by weight, and the content of the second component is 0.5 parts by weight. Further, the texture value of this carbon fiber bundle was measured. As a result, it was 65, and approximately equal to the value in a system in which only the second component was imparted.

Subsequently, a uniaxially-aligned carbon fiber composite was obtained in the same manner as in Example 1. The thickness of the molded plate was 1.76 mm, and the fiber volume content (Vf) thereof was 48%. Further, the impregnation rate obtained from the measurement by two-dimensional mapping (C-scan) of the ultrasonic flaw detection method was 75%.

Further, a random mat carbon fiber composite (isotropic carbon fiber composite material) was obtained in the same manner as in Example 1. The carbon fiber random mat composite material molded plate having a thickness of 2.00 mm and a fiber volume content (Vf) of 40% by volume was obtained. Further, the impregnation rate obtained from the measurement by two-dimensional mapping (C-scan) of the ultrasonic flaw detection method was 80%. The bending strength of the resulting molded plate was measured. As a result, a good physical property value was able to be obtained.

The invention claimed is:

1. A reinforcing carbon fiber bundle comprising a sizing agent adhered to a surface of carbon fibers,
    wherein the sizing agent comprises at least two components,
    a first component of the at least two components does not melt at 150° C., and
    a second component of the at least two components is a polyamide ternary copolymer resin and has fluidity at 150° C.

2. The reinforcing carbon fiber bundle according to claim 1,
    wherein the first component is in a granular form.

3. The reinforcing carbon fiber bundle according to claim 1,
    wherein an amount of the sizing agent adhered to the carbon fibers is within a range of 0.1 to 20% by weight.

4. The reinforcing carbon fiber bundle according to claim 1,
    wherein a content (weight ratio) of the first component is twice or more a content of the second component.

5. The reinforcing carbon fiber bundle according to claim 1, wherein the first component is adhered to the surface of carbon fibers through the second component.

6. The reinforcing carbon fiber bundle according to claim 1,
wherein a melting point of the first component is 150° C. or more, and
a melting point of the second component is less than 150° C.

7. A composite comprising the reinforcing carbon fiber bundle according to claim 1 and a resin.

8. The composite according to claim 7,
wherein the resin is a thermoplastic resin.

9. The composite according to claim 7,
wherein the reinforcing carbon fiber bundle is composed of fibers having a length of 100 mm or less.

10. The composite according to claim 7,
wherein the reinforcing carbon fiber bundle is composed of continuous fibers.

11. A method for manufacturing a composite, comprising press molding a mixture of the reinforcing carbon fiber bundle according to claim 1 and a resin.

12. The method for manufacturing a composite according to claim 11,
wherein the reinforcing carbon fiber bundle in the mixture is arranged randomly in plane.

13. A method for manufacturing a reinforcing carbon fiber bundle, comprising drying a carbon fiber bundle to which a sizing liquid is imparted,
wherein the sizing liquid comprises at least two components, and
at a drying temperature, a first component of the at least two components does not melt and a second component of the at least two components is a polyamide ternary copolymer resin and has fluidity.

14. The method for manufacturing a reinforcing carbon fiber bundle according to claim 13,
wherein the first component is in a granular form.

15. The method for manufacturing a reinforcing carbon fiber bundle according to claim 13,
wherein the second component is in a granular form in the sizing liquid.

16. The method for manufacturing a reinforcing carbon fiber bundle according to claim 13,
wherein a particle size of the first component or a particle size of the second component is 5 µm or less.

17. The method for manufacturing a reinforcing carbon fiber bundle according to claim 13,
wherein a content (weight ratio) of the first component is twice or more a content of the second component.

18. The method for manufacturing a reinforcing carbon fiber bundle according to claim 13,
wherein a melting point of the first component is equivalent to or more than the drying temperature, and
a melting point of the second component is less than the drying temperature.

* * * * *